(12) United States Patent
Kondo

(10) Patent No.: US 12,544,859 B2
(45) Date of Patent: Feb. 10, 2026

(54) WORKPIECE PROCESSING METHOD AND PROCESSING MACHINE

(71) Applicant: DMG MORI CO., LTD., Nara (JP)

(72) Inventor: Masaki Kondo, Nara (JP)

(73) Assignee: DMG MORI CO., LTD., Nara (JP)

( * ) Notice: Subject to any disclaimer, the term of this patent is extended or adjusted under 35 U.S.C. 154(b) by 704 days.

(21) Appl. No.: 18/010,107

(22) PCT Filed: Jun. 19, 2020

(86) PCT No.: PCT/JP2020/024133
§ 371 (c)(1),
(2) Date: Dec. 13, 2022

(87) PCT Pub. No.: WO2021/255918
PCT Pub. Date: Dec. 23, 2021

(65) Prior Publication Data
US 2023/0264295 A1 Aug. 24, 2023

(51) Int. Cl.
*B23K 26/342* (2014.01)
*B22F 10/28* (2021.01)
(Continued)

(52) U.S. Cl.
CPC ............ *B23K 26/342* (2015.10); *B22F 10/28* (2021.01); *B22F 12/41* (2021.01);
(Continued)

(58) Field of Classification Search
CPC ......... B33Y 30/00; B33Y 10/00; B33Y 50/02; B33Y 40/00; B23K 26/342; B23K 26/144;
(Continued)

(56) References Cited

U.S. PATENT DOCUMENTS

| | | | | |
|---|---|---|---|---|
| 2011/0089151 A1* | 4/2011 | Miyagi | ................... | B23K 26/34 |
| | | | | 219/121.6 |
| 2012/0267345 A1* | 10/2012 | Clark | ..................... | B23K 26/34 |
| | | | | 219/121.35 |

(Continued)

FOREIGN PATENT DOCUMENTS

| | | |
|---|---|---|
| CN | 107000059 A | 8/2017 |
| EP | 2514553 A2 | 10/2012 |

(Continued)

*Primary Examiner* — Chris Q Liu
(74) *Attorney, Agent, or Firm* — IP Business Solutions, LLC.

(57) ABSTRACT

A workpiece processing method includes performing additive manufacturing for a first region of a workpiece; and performing additive manufacturing for a second region of the workpiece, the second region being smaller in width than the first region. The performing additive manufacturing for the first region includes positioning an additive-manufacturing head and the workpiece relative to each other so as to make a distance between the workpiece and a laser beam emitter in the additive-manufacturing head equal to a first distance. The performing additive manufacturing for the second region includes positioning the additive-manufacturing head and the workpiece relative to each other so as to make the distance between the workpiece and the laser beam emitter in the additive-manufacturing head equal to a second distance that is smaller than the first distance.

8 Claims, 12 Drawing Sheets

(51) Int. Cl.
*B22F 12/41* (2021.01)
*B23K 26/06* (2014.01)
*B23K 26/073* (2006.01)
*B23K 26/08* (2014.01)
*B33Y 10/00* (2015.01)
*B33Y 30/00* (2015.01)
*B23K 101/00* (2006.01)

(52) U.S. Cl.
CPC ...... *B23K 26/0648* (2013.01); *B23K 26/0665* (2013.01); *B23K 26/0734* (2013.01); *B23K 26/0869* (2013.01); *B33Y 10/00* (2014.12); *B33Y 30/00* (2014.12); *B23K 2101/001* (2018.08)

(58) Field of Classification Search
CPC ............ B23K 26/34; B23K 26/0876; B23K 26/0823; B23K 26/0626; B23K 26/073; B23K 26/0734; B23K 26/082; B23K 26/147; B23K 35/0244; B23K 26/0665; B23K 26/08; B23K 26/1464; B23K 26/21; B23K 2101/18; B23K 2101/34; B23K 2103/30; B23K 26/0006; B23K 26/0093; B23K 26/02; B23K 26/064; B23K 26/0643; B23K 26/0732; B23K 26/083; B23K 26/0869; B23K 26/0884; B23K 26/1476; B23K 26/1482; B23K 26/324; B23K 26/032; B23K 26/044; B23K 26/0604; B23K 26/0608; B23K 26/0648; B23K 26/0676; B23K 26/0853; B23K 26/123; B23K 26/1462; B23K 26/702; B23K 26/703; B23K 37/04
USPC .............. 219/121.12, 121.35, 121.6, 121.66
See application file for complete search history.

(56) References Cited

U.S. PATENT DOCUMENTS

| | | | |
|---|---|---|---|
| 2014/0099476 A1* | 4/2014 | Subramanian | B29C 64/153 428/164 |
| 2017/0304946 A1* | 10/2017 | Shibazaki | B33Y 30/00 |
| 2018/0036948 A1* | 2/2018 | Fujishima | B29C 64/264 |
| 2018/0056446 A1* | 3/2018 | Mezawa | B29C 67/00 |
| 2018/0065208 A1* | 3/2018 | Mori | B23K 26/342 |
| 2019/0009358 A1* | 1/2019 | Vorontsov | B22F 10/28 |
| 2019/0151990 A1* | 5/2019 | Mezawa | B23K 26/0876 |
| 2019/0270246 A1* | 9/2019 | Fujishima | B29C 64/268 |
| 2020/0276673 A1* | 9/2020 | Stürmer | B33Y 30/00 |
| 2020/0406359 A1* | 12/2020 | Kusaka | B22F 12/90 |
| 2021/0308796 A1* | 10/2021 | Morita | B23K 26/1464 |

FOREIGN PATENT DOCUMENTS

| | | |
|---|---|---|
| JP | 2011088154 A | 5/2011 |
| JP | 2015200732 A | 11/2015 |
| WO | 2016075801 A1 | 5/2016 |
| WO | 2017115406 A1 | 7/2017 |
| WO | 2018211594 A1 | 11/2018 |

* cited by examiner

WORKPIECE PROCESSING METHOD AND PROCESSING MACHINE

TECHNICAL FIELD

The present invention relates to a workpiece processing method and a processing machine.

BACKGROUND ART

For example, WO 2018/211594 A (PTL 1) discloses an additive-manufacturing head including a laser beam forming unit that includes a first axicon lens and a second axicon lens arranged to face each other, and a convex lens disposed between the first axicon lens and the second axicon lens, and causes laser beam incident on the first axicon lens to exit from the second axicon lens as ring-shaped laser, and a lens moving mechanism that moves the convex lens in an optical axis direction of the laser beam.

CITATION LIST

Patent Literature

PTL 1: WO 2018/211594 A

SUMMARY OF INVENTION

Technical Problem

As disclosed in PTL 1 described above, an additive manufacturing method is known by which while ring-shaped laser beam is being emitted toward a workpiece, a material powder is fed from the inside of the ring-shaped laser beam toward the workpiece surface. Under such an additive manufacturing method, there are various regions on the workpiece surface to be subjected to additive manufacturing, so that it is required that the size (spot diameter) of the irradiation region of the laser beam be controlled in accordance with the region on the workpiece surface.

On the other hand, in the additive-manufacturing head disclosed in PTL 1, the distance between the first axicon lens and the convex lens in the optical axis direction of the laser beam is changed by the movement of the convex lens in the laser beam forming unit to control the size of the irradiation region of the laser beam formed on the workpiece surface. The optical component provided inside the additive-manufacturing head, however, is very delicate, so that it is also required that the optical component be driven as little as possible.

It is therefore an object of the present invention to solve the above-described problems and provide a workpiece processing method allowing the size of an irradiation region of laser beam to be controlled in accordance with a region on a workpiece surface to be subjected to additive manufacturing in a simple manner, and a processing machine that performs such a workpiece processing method.

Solution to Problem

A workpiece processing method according to the present invention is a processing method for performing additive manufacturing for a workpiece by emitting a ring-shaped laser beam from an additive-manufacturing head toward the workpiece, and ejecting material powder from an inside of the ring-shaped laser beam while causing the additive-manufacturing head and the workpiece to move relative to each other. The additive-manufacturing head includes a laser beam emitter that emits the ring-shaped laser beam toward the workpiece. The workpiece processing method includes performing additive manufacturing for a first region of the workpiece, and performing additive manufacturing for a second region of the workpiece. A width of the first region in a direction that is orthogonal to a direction in which the additive-manufacturing head and the workpiece move relative to each other and a center axis direction of the ring-shaped laser beam is smaller than a width of the second region in a direction that is orthogonal to the direction in which the additive-manufacturing head and the workpiece move relative to each other and the center axis direction of the ring-shaped laser beam. The performing additive manufacturing for the first region includes positioning the additive-manufacturing head and the workpiece relative to each other so as to make a distance between the workpiece and the laser beam emitter equal to a first distance. The performing additive manufacturing for the second region includes positioning the additive-manufacturing head and the workpiece relative to each other so as to make the distance between the workpiece and the laser beam emitter equal to a second distance that is smaller than the first distance.

Under the workpiece processing method configured as described above, when the first region having a relatively small width is to be subjected to additive manufacturing, making the distance between the workpiece and the laser beam emitter equal to the first distance that is larger than the second distance causes a decrease in the irradiation region of the ring-shaped laser beam on the workpiece surface. This makes it possible to perform precise additive manufacturing for the first region of the workpiece. Further, when the second region having a relatively large width is to be subjected to additive manufacturing, making the distance between the workpiece and the laser beam emitter equal to the second distance that is smaller than the first distance causes an increase in the irradiation region of the ring-shaped laser beam on the workpiece surface. This makes it possible to perform efficient additive manufacturing for the second region of the workpiece. This in turn allows the size of the irradiation region of laser beam to be controlled in accordance with the region on the workpiece surface to be subjected to additive manufacturing in a simple manner.

It is further preferable that the additive-manufacturing head be swivelable about a predetermined axis orthogonal to the center axis direction of the ring-shaped laser beam. The workpiece processing method further includes, between the performing additive manufacturing for the first region and performing additive manufacturing for the second region, changing a posture of the additive-manufacturing head by swiveling the additive-manufacturing head about the predetermined axis.

Under the workpiece processing method configured as described above, swiveling the additive-manufacturing head allows the additive-manufacturing head to change in posture suitable for the emission of the ring-shaped laser beam to the first region and the second region to be processed.

It is further preferable that, in the performing additive manufacturing for the second region, the posture of the additive-manufacturing head be maintained so as to make the center axis of the ring-shaped laser beam parallel to a horizontal direction.

Under the workpiece processing method configured as described above, when the center axis of the ring-shaped laser beam is parallel to the horizontal direction, a phenomenon may occur in which the material powder ejected from the inside of the ring-shaped laser beam toward the workpiece falls downward due to gravity. Therefore, making the distance between the workpiece and the laser beam emitter equal to the second distance that is relatively small allows the material powder to reach the workpiece before the material powder largely falls downward. This allows an increase in utilization efficiency of the material powder.

It is further preferable that the workpiece be a turbine blade having a leading edge, a trailing edge, a blade surface extending between the leading edge and the trailing edge, and a side surface that is a flat surface disposed at an end of the blade surface, the turbine blade being repaired by additive manufacturing. The leading edge or the trailing edge includes the first region. The side surface includes the second region.

Under the workpiece processing method configured as described above, a decrease in the irradiation region of the ring-shaped laser beam on the workpiece surface allows a partial loss or the like generated in the leading edge or the trailing edge of the turbine blade to be subjected to precise additive manufacturing. Further, an increase in the irradiation region of the ring-shaped laser beam on the workpiece surface allows the side surface of the turbine blade that has entirely worn out to be subjected to efficient additive manufacturing.

It is further preferable that the workpiece be a turbine blade having a leading edge, a trailing edge, a blade surface extending between the leading edge and the trailing edge, and a side surface that is a flat surface disposed at an end of the blade surface, the turbine blade being repaired by additive manufacturing. The blade surface includes the first region and the second region.

Under the workpiece processing method configured as described above, a decrease in the irradiation region of the ring-shaped laser beam on the workpiece surface allows a relatively small crack or the like generated in the blade surface of the turbine blade to be subjected to precise additive manufacturing. Further, an increase in the irradiation region of the ring-shaped laser beam on the workpiece surface allows a relatively large depression or the like generated in the blade surface of the turbine blade to be subjected to efficient additive manufacturing.

It is further preferable that the additive-manufacturing head be swivelable about a predetermined axis extending in a horizontal direction. The workpiece processing method further includes, before the performing additive manufacturing for the first region and the performing additive manufacturing for the second region, holding the workpiece with a spindle extending in the horizontal direction and having a rotation axis orthogonal to the predetermined axis so as to position the leading edge, the trailing edge, and the blade surface radially outward of the rotation axis and causing the side surface to face in an axial direction of the rotation axis.

Under the workpiece processing method configured as described above, swiveling the additive-manufacturing head and rotating the spindle allows the leading edge, the trailing edge, the blade surface, and the side surface of the turbine blade to be successively subjected to additive manufacturing.

A processing machine according to the present invention is a processing machine that performs the workpiece processing method according to any one of the above. The processing machine includes the additive-manufacturing head including the laser beam emitter, a workpiece holder that holds the workpiece, and a moving mechanism that causes the additive-manufacturing head and the workpiece holder to move relative to each other.

The processing machine configured as described above can control the size of the irradiation region of laser beam in accordance with the region on the workpiece surface to be subjected to additive manufacturing.

It is further preferable that the additive-manufacturing head include an optical lens. The optical lens is fixed in the additive-manufacturing head so as to make a distance from the laser beam emitter to a focal position of the ring-shaped laser beam uniform.

The processing machine configured as described above can maintain the reliability of the optical system in the additive-manufacturing head.

Advantageous Effects of Invention

As described above, according to the present invention, it is possible to provide the workpiece processing method allowing the size of the irradiation region of laser beam to be controlled in accordance with the region on the workpiece surface to be subjected to additive manufacturing in a simple manner, and the processing machine that performs such a workpiece processing method.

DESCRIPTION OF EMBODIMENTS

Figure 1:
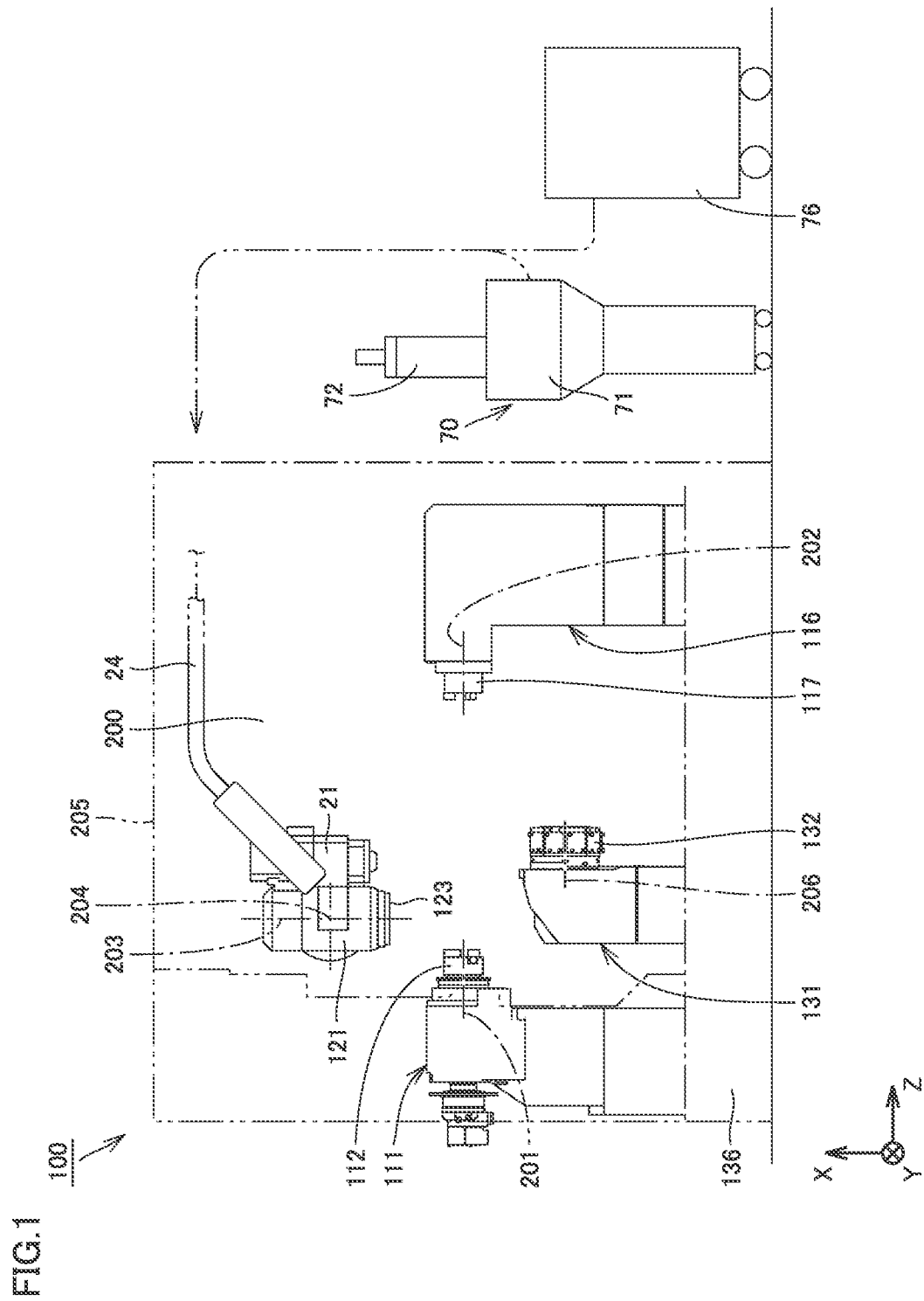
FIG. 1 is a front view of a processing machine.

Embodiments according to the present invention will be described with reference to the drawings. Note that, in the drawings to be referenced below, the same or corresponding members are denoted by the same reference numerals.

First Embodiment

Figure 2:
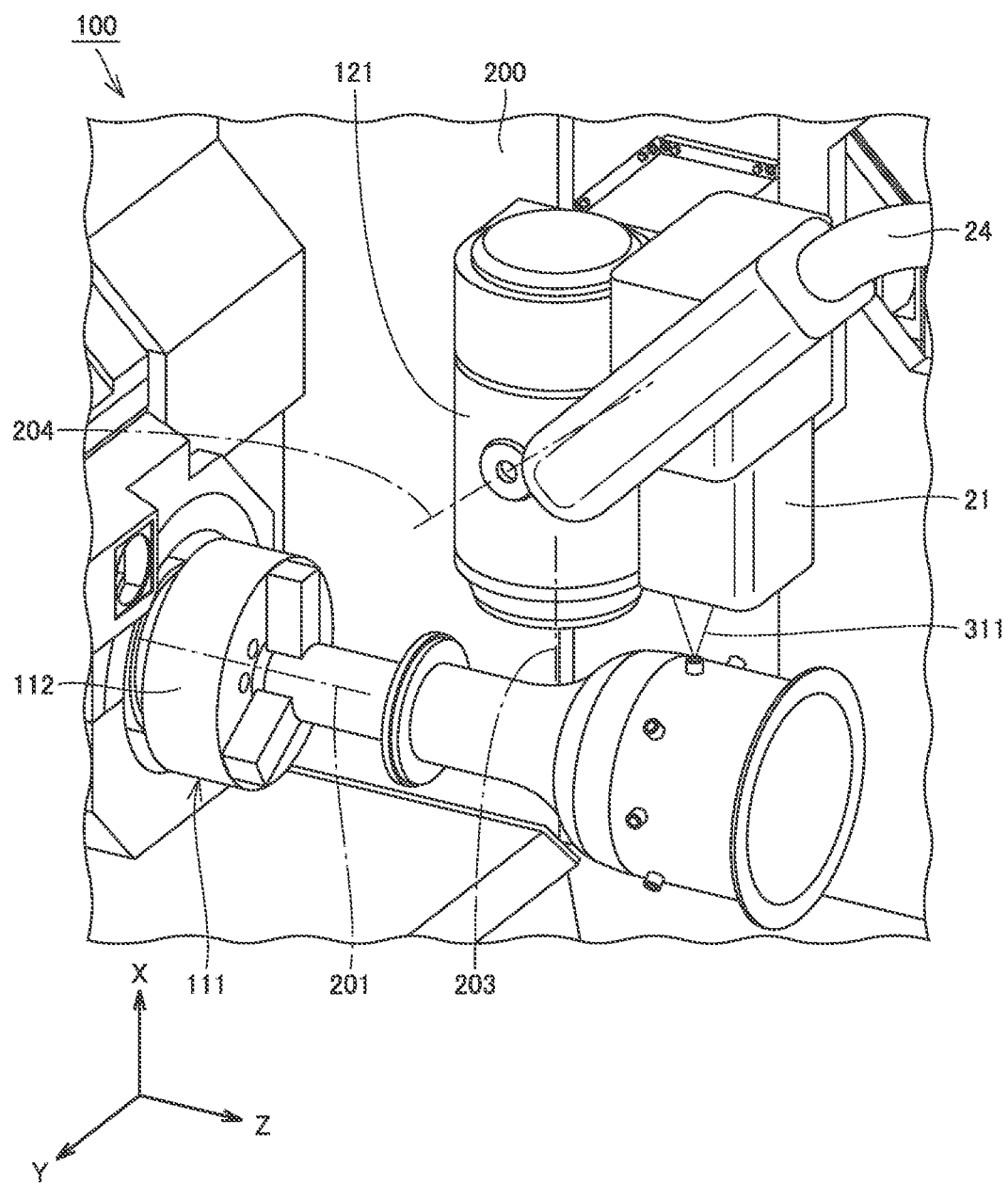
FIG. 2 is a perspective view of the processing machine in FIG. 1, illustrating how a processing area is during additive manufacturing.

FIG. 1 is a front view of a processing machine. FIG. 1 illustrates an inside of the processing machine when seen through a cover body serving as an exterior of the processing machine. FIG. 2 is a perspective view of the processing machine in FIG. 1, illustrating how a processing area is during additive manufacturing.

With reference to FIGS. 1 and 2, a processing machine 100 is an AM/SM hybrid processing machine capable of performing additive manufacturing (AM) for a workpiece and subtractive manufacturing (SM) for a workpiece. Processing machine 100 has a turning function using a fixed tool and a milling function using a rotary tool as a function of SM processing. The processing machine 100 is a numerically control (NC) processing machine in which various operations for workpiece processing are automated by numerical control using a computer.

Herein, an axis parallel to a left-right direction (width direction) of processing machine 100 and extending in a horizontal direction is referred to as a "Z axis", an axis parallel to a front-rear direction (depth direction) of processing machine 100 and extending in the horizontal direction is referred to as a "Y axis", and an axis extending in a vertical direction is referred to as an "X axis". In FIG. 1, a rightward direction is referred to as "+Z-axis direction", and a leftward direction is referred to as "—Z-axis direction". In FIG. 1, a frontward direction of a paper surface is referred to as a "+Y-axis direction", and a backward direction is referred to as a "—Y-axis direction". In FIG. 1, an upward direction is referred to as a "+X-axis direction", and a downward direction is referred to as a "—X-axis direction".

First, a structure of processing machine 100 that performs the workpiece processing method according to the present embodiment will be described.

Processing machine 100 includes a bed 136, a first headstock 111, a second headstock 116, a tool spindle 121, and a lower tool rest 131.

Bed 136 is a base member that supports first headstock 111, second headstock 116, tool spindle 121, and lower tool rest 131, and is installed on a floor surface of a factory or the like. First headstock 111 (a first spindle 112 to be described later), second headstock 116, tool spindle 121, and lower tool rest 131 are installed in a processing area 200 defined by a splash guard 205.

Processing area 200 is a space in which subtractive manufacturing and additive manufacturing for a workpiece are performed, and that is tightly covered so as to prevent foreign matters such as chips, cutting oil, fumes, and the like generated by workpiece processing from escaping to the outside of processing area 200.

First headstock 111 and second headstock 116 are provided to face each other in the Z-axis direction. First headstock 111 and second headstock 116 include first spindle 112 and a second spindle 117, respectively, first spindle 112 and second spindle 117 being configured to rotate a workpiece for turning processing using a fixed tool or holding the workpiece for milling processing or subtractive manufacturing processing using a rotary tool. First spindle 112 is provided so as to be rotatable about a center axis 201 parallel to the Z axis, and second spindle 117 is provided so as to be rotatable about a center axis 202 parallel to the Z axis. First spindle 112 and second spindle 117 are each provided with a chuck mechanism that detachably holds the workpiece.

In the present embodiment, the workpiece is held by first spindle 112 of first headstock 111 (corresponding to a "spindle" and a "workpiece holder" according to the present invention). Note that the "workpiece holder" according to the present invention is not limited to such a workpiece spindle capable of rotating the workpiece, and may be, for example, a pallet or the like mounted on a table.

Second headstock 116 is provided so as to be movable in the Z-axis direction by various mechanisms such as a feed mechanism, a guide mechanism, and a servomotor. Note that second headstock 116 may be of a fixed type.

Tool spindle (upper tool rest) 121 rotates the rotary tool for milling processing using the rotary tool. Tool spindle 121 is provided so as to be rotatable about a center axis 203 parallel to the X axis. Tool spindle 121 is provided with a clamp mechanism that detachably holds the rotary tool.

Tool spindle 121 is supported over bed 136 by a column (not illustrated) or the like. Tool spindle 121 is provided so as to be movable in the X-axis direction, the Y-axis direction, and the Z-axis direction by various mechanisms such as a feed mechanism, a guide mechanism, and a servomotor provided in the column or the like. A processing position of the rotary tool attached to tool spindle 121 changes three-dimensionally.

Further, tool spindle 121 is provided so as to be swivelable about a swiveling center axis 204 parallel to the Y axis (B-axis swiveling). A swiveling range of tool spindle 121 is a range of ±120° relative to a posture (posture illustrated in FIG. 1) in which a spindle end surface 123 of tool spindle 121 faces downward. The swiveling range of tool spindle 121 is preferably within a range of at least ±90° relative to the posture illustrated in FIG. 1 (hereinafter, the posture of tool spindle 121 illustrated in FIG. 1 is also referred to as a "reference posture").

Although not illustrated in FIG. 1, an automatic tool changer (ATC) that automatically changes a tool attached to tool spindle 121 and a tool magazine that stores replacement tools attachable to tool spindle 121 are provided near first headstock 111.

A plurality of fixed tools used for turning processing are attached to lower tool rest 131. Lower tool rest 131 is of a so-called turret type to which the plurality of fixed tools are radially attached and performs swivel indexing.

More specifically, lower tool rest 131 includes a swiveling portion 132.

Swiveling portion 132 is provided so as to be swivelable about a center axis 206 parallel to the Z axis. A plurality of tool holders that hold fixed tools are attached at positions spaced apart from each other in a circumferential direction around center axis 206. When swiveling portion 132 swivels about center axis 206, the fixed tools held by the tool holders move in the circumferential direction, and a fixed tool used for turning processing is indexed.

Lower tool rest 131 is supported on bed 136 by a saddle or the like (not illustrated). Lower tool rest 131 is provided so as to be movable in the X-axis direction and the Z-axis direction by various mechanisms such as a feed mechanism, a guide mechanism, and a servomotor provided on the saddle or the like.

Processing machine 100 further includes an additive-manufacturing head 21. Additive-manufacturing head 21 performs additive manufacturing by irradiating the workpiece with laser beam while feeding a material powder to the workpiece (directed energy deposition). As the material powder, for example, a metal powder such as stainless steel, a cobalt-based alloy, a nickel-based alloy, or titanium can be used.

Note that the material powder is not limited to such a metal powder.

Additive-manufacturing head 21 is detachably attached to tool spindle 121. In order to perform the additive manufacturing, additive-manufacturing head 21 is attached to tool spindle 121. As tool spindle 121 moves in the X-axis direction, the Y-axis direction, and the Z-axis direction, a processing position of the additive manufacturing by additive-manufacturing head 21 changes three-dimensionally. Further, as tool spindle 121 swivels about swiveling center axis 204, additive-manufacturing head 21 also swivels about swiveling center axis 204 (corresponding to a "predetermined axis" according to the present invention) together with tool spindle 121. This allows a direction of the additive manufacturing by additive-manufacturing head 21 (a direction of the laser beam with which the workpiece is irradiated) to freely change.

In order to perform the subtractive manufacturing processing, additive-manufacturing head 21 is separated from tool spindle 121 and stored in a head stocker (not illustrated).

Tool spindle 121 is provided with a clamp mechanism, and when additive-manufacturing head 21 is attached to tool spindle 121, the clamp mechanism operates to connect additive-manufacturing head 21 to tool spindle 121. Examples of the clamp mechanism include a mechanism that obtains a clamped state using spring force and obtains an unclamped state using hydraulic pressure.

Processing machine 100 further includes a powder feeder 70, a laser oscillation device 76, and a cable 24.

Powder feeder 70 feeds the material powder to be used for the additive manufacturing toward additive-manufacturing head 21 in processing area 200.

Powder feeder 70 includes a powder hopper 72 and a mixer 71. Powder hopper 72 forms a closed space for storing the material powder to be used for the additive manufacturing. Mixer 71 mixes the material powder stored in powder hopper 72 with a carrier gas of the material powder.

Laser oscillation device 76 oscillates the laser beam to be used for the additive manufacturing. Cable 24 includes an optical fiber that guides the laser beam from laser oscillation device 76 toward additive-manufacturing head 21, a pipe that guides the material powder from powder feeder 70 toward additive-manufacturing head 21, an air pipe serving as an air flow path, a gas pipe serving as an inert gas flow path, a cooling pipe serving as a refrigerant flow path, electric wiring, and a tube member that accommodates these.

Figure 3:
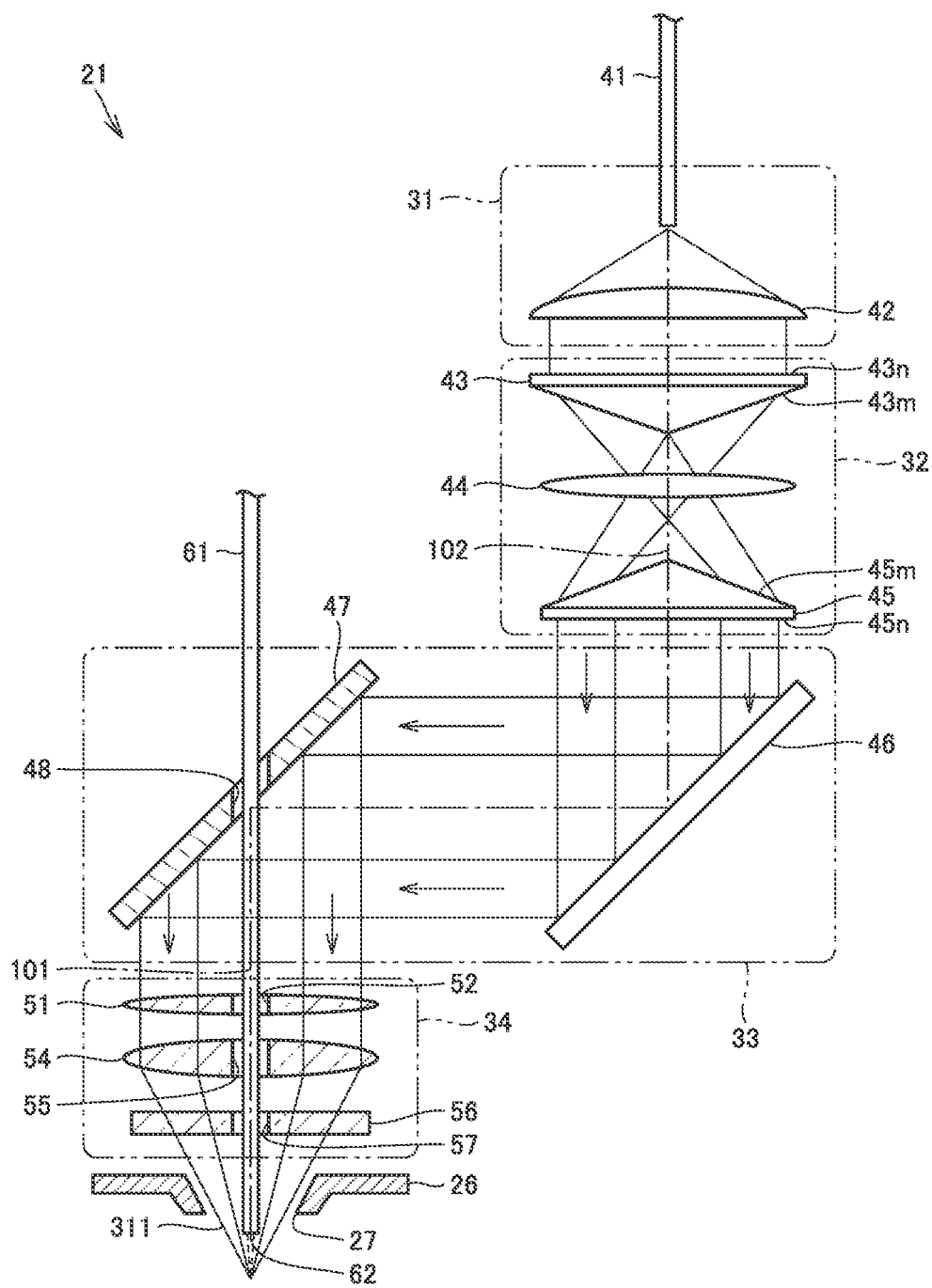
FIG. 3 is a diagram illustrating an internal structure of an additive-manufacturing head in FIGS. 1 and 2.

Next, a structure of additive-manufacturing head 21 will be described in detail. FIG. 3 is a diagram illustrating an internal structure of the additive-manufacturing head in FIGS. 1 and 2.

With reference to FIG. 3, additive-manufacturing head 21 includes a laser beam collimator 31, a ring-shaped laser beam forming unit 32, a laser beam guide 33, and a laser beam emitter 34 as an optical system that emits, toward the workpiece, laser beam that has entered from the outside.

Laser beam collimator 31, ring-shaped laser beam forming unit 32, laser beam guide 33, and laser beam emitter 34 are arranged in this order from an upstream side to a downstream side of an optical path of the laser beam in additive-manufacturing head 21.

Laser beam from cable 24 (see FIGS. 1 and 2) is guided to laser beam collimator 31 through an optical fiber 41. Laser beam collimator 31 includes a collimation lens 42. Collimation lens 42 is provided on a center axis 102. Laser beam collimator 31 collimates, using collimation lens 42, the laser beam input from optical fiber 41 and sends the laser beam toward ring-shaped laser beam forming unit 32.

Ring-shaped laser beam forming unit 32 includes an axicon lens 43, an axicon lens 45, and a spherical lens 44. Axicon lens 43, spherical lens 44, and axicon lens 45 are arranged in this order from the upstream side to the downstream side of the optical path of the laser beam in additive-manufacturing head 21. Axicon lens 43, spherical lens 44, and axicon lens 45 are provided on center axis 102.

Axicon lens 43 has one surface 43m that is a conical surface and another surface 43n that is a flat surface. Axicon lens 45 has one surface 45m that is a conical surface and another surface 45n that is a flat surface. Axicon lens 43 and axicon lens are arranged so as to cause one surface 43m of axicon lens 43 and one surface 45m of axicon lens 45 to face each other.

Ring-shaped laser beam forming unit 32 forms the laser beam input from the laser beam collimator 31 in a ring shape using axicon lens 43, spherical lens 44, and axicon lens 45. The laser beam output from ring-shaped laser beam forming unit 32 has a ring shape, in other words, a shape that circles in a band shape around center axis 102, taken along a plane orthogonal to a traveling direction of the laser beam. In the present embodiment, ring-shaped laser beam forming unit 32 forms the laser beam input from laser beam collimator 31 into a circular ring shape. The ring-shaped laser beam emitted from ring-shaped laser beam forming unit 32 is centered around center axis 102 and travels in an axial direction of center axis 102.

Laser beam guide 33 includes a guide mirror 46 and a guide mirror 47. Guide mirror 46 and guide mirror 47 are arranged in this order from the upstream side to the downstream side of the optical path of the laser beam in additive-manufacturing head 21. Guide mirror 46 is provided on center axis 102. Guide mirror 46 is provided obliquely to center axis 102. Guide mirror 47 is provided on a center axis 101 parallel to center axis 102. Guide mirror 47 is provided obliquely to center axis 101.

Laser beam guide 33 causes the ring-shaped laser beam input from ring-shaped laser beam forming unit 32 to reflect off guide mirror 46 and guide mirror 47 to guide the ring-shaped laser beam toward laser beam emitter 34. Ring-shaped laser beam output from laser beam guide 33 is centered around center axis 101 and travels in an axial direction of center axis 101.

Laser beam emitter 34 includes a condenser lens 51, a condenser lens 54, and a protective lens 56. Condenser lens 51, condenser lens 54, and protective lens 56 are arranged in this order from the upstream side to the downstream side of the optical path of the laser beam in additive-manufacturing head 21. Condenser lens 51, condenser lens 54, and protective lens 56 are provided on center axis 101.

Laser beam emitter 34 emits the ring-shaped laser beam input from laser beam guide 33 toward the workpiece. Laser beam emitter 34 causes condenser lens 51 and condenser lens 54 to concentrate the ring-shaped laser beam to be emitted toward the workpiece. The ring-shaped laser beam emitted from laser beam emitter 34 is centered around center axis 101 and travels in the axial direction of center axis 101. Protective lens 56 is provided so as to protect a lens system built into additive-manufacturing head 21 against an external atmosphere.

Note that swiveling center axis 204 illustrated in FIG. 1 is orthogonal to the center axis direction (the axial direction of center axis 101) of the ring-shaped laser beam and is orthogonal to center axis 201 that is the rotation axis of first spindle 112. Additive-manufacturing head 21 is swivelable about swiveling center axis 204.

Additive-manufacturing head 21 includes a material powder feeding unit 61 as a mechanism that feeds the material powder to the workpiece.

Material powder feeding unit 61 is made of a pipe material capable of feeding the material powder. Material powder feeding unit 61 is provided along center axis 101. The material powder from cable 24 (see FIGS. 1 and 2) is guided to material powder feeding unit 61. Material powder feeding unit 61 includes an ejection port 62. Ejection port 62 is an opening of material powder feeding unit 61 from which the material powder is ejected. Material powder feeding unit 61 ejects the material powder from ejection port 62 toward the workpiece. Ejection port 62 has a circular opening shape.

Ejection port 62 is disposed inside the ring-shaped laser beam emitted from laser beam emitter 34. Therefore, material powder feeding unit 61 ejects the material powder from the inside of the ring-shaped laser beam emitted from laser beam emitter 34. Ejection port 62 is disposed on center axis 101. Both the feeding of the material from ejection port 62 toward the workpiece and the emission of the ring-shaped laser beam from laser beam emitter 34 toward the workpiece are on center axis 101, that is, on the same axis.

Ejection port 62 is disposed on the downstream side of condenser lens 51 and the condenser lens 54 on the optical path of the laser beam in additive-manufacturing head 21. Ejection port 62 is provided on the downstream side of protective lens 56 on the optical path of the laser beam in additive-manufacturing head 21.

A through-hole 48 is formed through guide mirror 47. Through-hole 48 is formed so as to pass through guide mirror 47 on center axis 101. Through-hole 48 has an opening surface larger than a cross section of material powder feeding unit 61 taken along a plane orthogonal to center axis 101. Material powder feeding unit 61 is inserted through through-hole 48.

A through-hole 52, a through-hole 55, and a through-hole 57 are formed through condenser lens 51, condenser lens 54, and protective lens 56, respectively.

Through-hole 52, through-hole 55, and through-hole 57 are formed so as to pass through condenser lens 51, condenser lens 54, and protective lens 56, respectively, on center axis 101. Through-hole 52, through-hole 55, and through-hole 57 each have an opening surface larger than the cross section of material powder feeding unit 61 taken along a plane orthogonal to center axis 101. Material powder feeding unit 61 is inserted through through-hole 52, through-hole 55, and through-hole 57.

Additive-manufacturing head 21 includes a cover body 26. Cover body 26 has a housing shape and forms a space for accommodating condenser lens 51, condenser lens 54, and protective lens 56. An opening 27 is formed through cover body 26. Opening 27 is disposed on center axis 101. Opening 27 is provided so as to face the workpiece surface during the additive manufacturing. Opening 27 allows the space in which condenser lens 51, condenser lens 54, and protective lens 56 are accommodated to communicate with an external space. The ring-shaped laser beam is emitted from laser beam emitter 34 to the external space through opening 27.

Ejection port 62 preferably protrudes toward the external space relative to opening 27 in the axial direction of center axis 101. This allows ejection port 62 to be disposed closer to the workpiece.

Ejection port 62 may be provided at a position that coincides with a position of opening 27 in the axial direction of center axis 101, or may be provided in cover body 26. Further, the position of ejection port 62 is not particularly limited as long as the position is inside the ring-shaped laser beam emitted from laser beam emitter 34, and may be a position shifted from center axis 101.

Material powder feeding unit 61 may include a plurality of pipe members. Further, the shape of ejection port 62 is not limited to the circular opening shape, and may be, for example, a circular ring opening shape. In this case, ejection port 62 ejects the material powder in a ring shape from the inside of the ring-shaped laser beam emitted from laser beam emitter 34, and the material powder ejected from ejection port 62 is fed to a ring-shaped region on the workpiece surface. The material powder may be ejected in accordance with the form of the ring-shaped laser beam whose diameter decreases as the distance from laser beam emitter 34 increases such that the diameter of the ring shape decreases as the distance from ejection port 62 increases.

Figure 4:
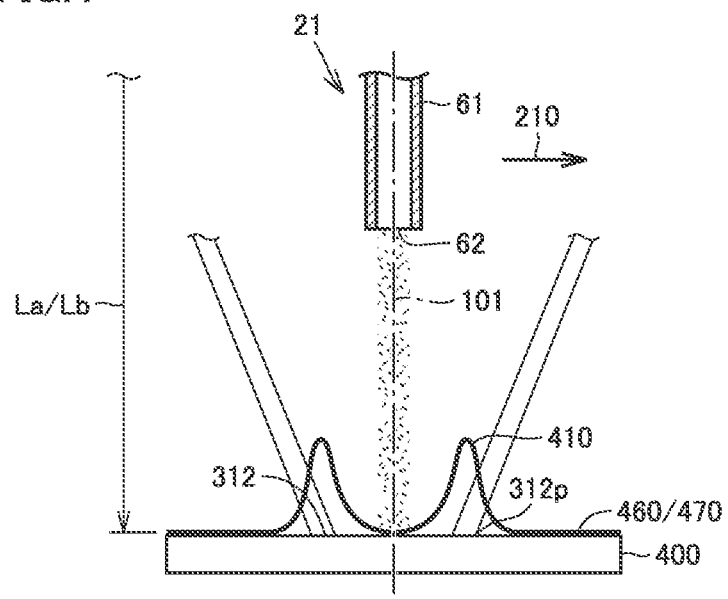
FIG. 4 is a cross-sectional view of a workpiece surface during the additive manufacturing.

Next, a workpiece processing method according to the present embodiment will be described. FIG. 4 is a cross-sectional view of a workpiece surface during additive manufacturing. Note that FIG. 4 illustrates a curve 410 representing a normalized density distribution of the laser beam on the workpiece surface.

With reference to FIGS. 1 to 4, under the workpiece processing method according to the present embodiment, additive manufacturing is performed on a workpiece 400 by emitting ring-shaped laser beam 311 from additive-manufacturing head 21 toward workpiece 400 and ejecting the material powder from the inside of ring-shaped laser beam 311 while causing additive-manufacturing head 21 and workpiece 400 to move relative to each other.

In the present embodiment, tool spindle 121 to which additive-manufacturing head 21 is attached is moved as indicated by an arrow 210 in FIG. 4, so as to cause additive-manufacturing head 21 and the workpiece 400 to move relative to each other. Note that as a method for causing additive-manufacturing head 21 and workpiece 400 to move relative to each other, first spindle 112 of first headstock 111 holding workpiece 400 may be rotated, or both the movement of additive-manufacturing head 21 and the rotation of first spindle 112 may be performed.

Various mechanisms such as a feed mechanism, a guide mechanism, and a servomotor that enable tool spindle 121 to move in the X-axis direction, the Y-axis direction, and the Z-axis direction, and a motor that rotates first spindle 112 constitute a moving mechanism that causes additive-manufacturing head 21 and first spindle 112 to move relative to each other.

Emitting ring-shaped laser beam 311 from additive-manufacturing head 21 toward workpiece 400 forms a ring-shaped laser beam irradiation region 312 on the workpiece surface. Further, ejecting the material powder from the inside of ring-shaped laser beam 311 toward workpiece 400 feeds the material powder to a region on the workpiece surface that includes an area inside an outer peripheral edge 312p of laser beam irradiation region 312. This causes the material powder to be melted and stuck to the workpiece surface.

Figure 5:
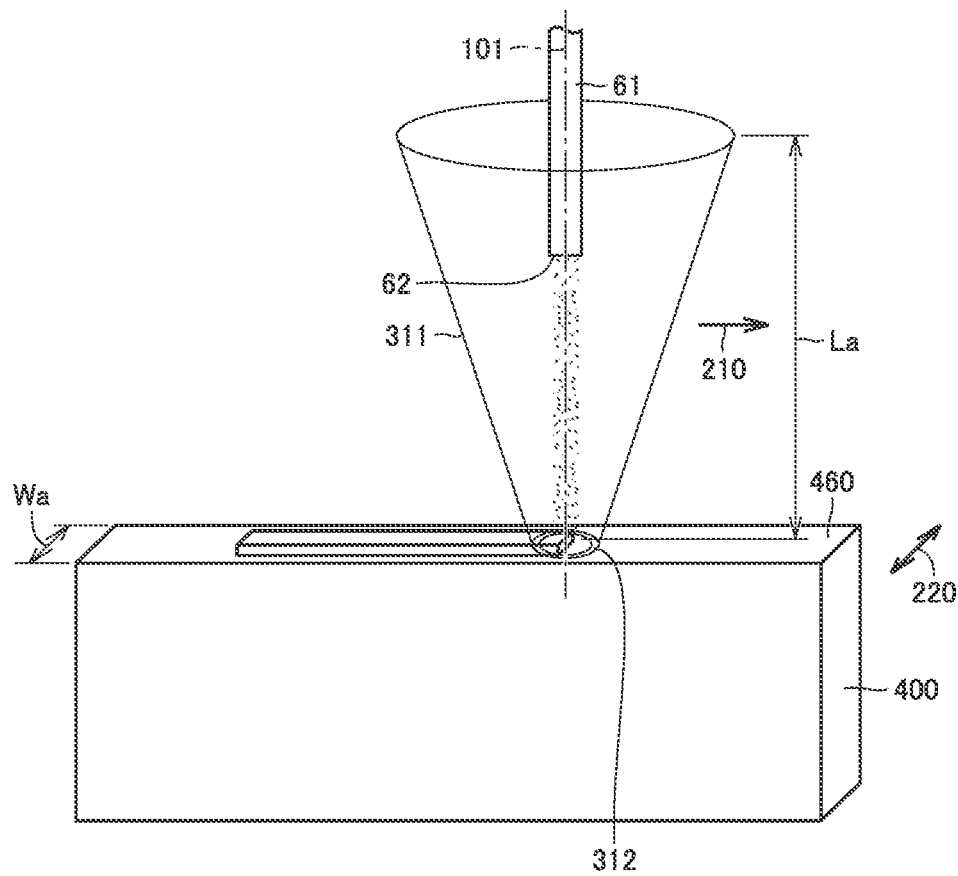
FIG. 5 is a perspective view illustrating a first step of a workpiece processing method according to a first embodiment of the present invention.
Figure 6:
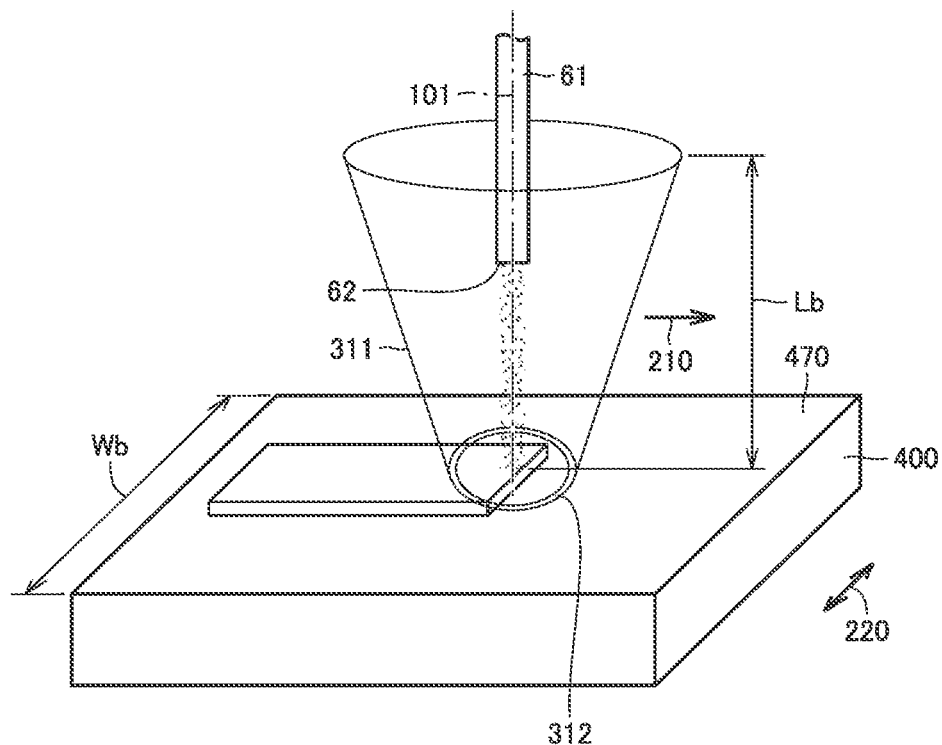
FIG. 6 is a perspective view illustrating a second step of the workpiece processing method according to the first embodiment of the present invention.
Figure 7:
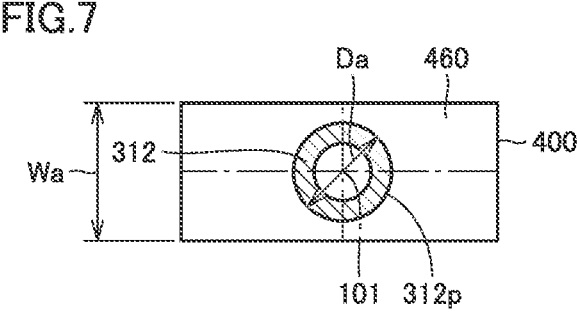
FIG. 7 is a plan view of the workpiece surface during step of the workpiece processing method in FIG. 5.
Figure 8:
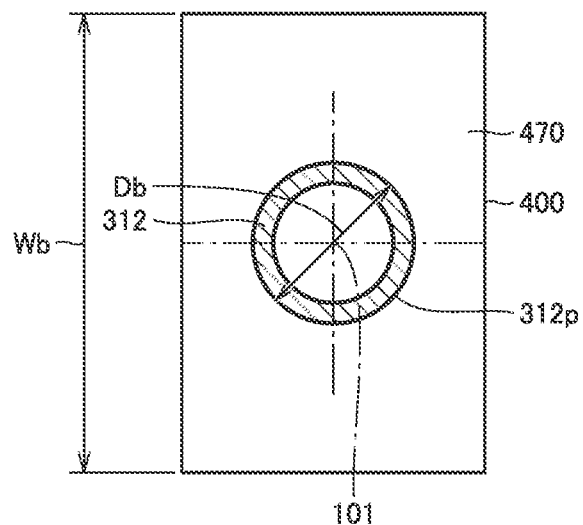
FIG. 8 is a plan view of the workpiece surface during step of the workpiece processing method in FIG. 6.

FIGS. 5 and 6 are perspective views illustrating steps of the workpiece processing method according to the first embodiment of the present invention. FIG. 7 is a plan view illustrating the workpiece surface during step of the workpiece processing method in FIG. 5. FIG. 8 is a plan view illustrating the workpiece surface during step of the workpiece processing method in FIG. 6.

With reference to FIGS. 5 to 8, the workpiece processing method includes steps of: performing additive manufacturing for a first region 460 of workpiece 400; and performing additive manufacturing for a second region 470 of workpiece 400. A width Wa of first region 460 in a direction (a direction indicated by an arrow 220) orthogonal to the relative movement direction of additive-manufacturing head 21 and workpiece 400 (the movement direction of additive-manufacturing head 21 indicated by an arrow 210) and the center axis direction of ring-shaped laser beam 311 (the axial direction of center axis 101) is smaller than a width Wb of second region 470 in the direction (the direction indicated by arrow 220) orthogonal to the relative movement direction of additive-manufacturing head 21 and workpiece 400 (the movement direction of additive-manufacturing head 21 indicated by arrow 210) and the center axis direction of ring-shaped laser beam 311 (the axial direction of center axis 101) (Wa<Wb).

As illustrated in FIG. 5, step of performing additive manufacturing for first region 460 includes step of positioning additive-manufacturing head 21 and workpiece 400 so as to make a distance between workpiece 400 and laser beam emitter 34 equal to a first distance La. As illustrated in FIG. 6, step of performing additive manufacturing for second region 470 includes step of positioning additive-manufacturing head 21 and workpiece 400 so as to make the distance between workpiece 400 and laser beam emitter 34 equal to a second distance Lb that is smaller than first distance La (Lb<La).

First region 460 and second region 470 are regions on the workpiece surface that are different from each other. First region 460 and second region 470 may be regions on the workpiece surface that are discontinuously provided. First region 460 and second region 470 may be regions on the workpiece surface that face in different directions. The workpiece surface in first region 460 and second region 470 may be a flat surface or a curved surface. The form of the workpiece surface in first region 460 and the form of the workpiece surface in second region 470 may be the same as or different from each other.

Width Wa of first region 460 may be uniform or may change as additive-manufacturing head 21 and workpiece 400 move relative to each other. Width Wb of second region 470 may be uniform or may change as additive-manufacturing head 21 and workpiece 400 move relative to each other. Even when width Wa of first region 460 and/or width Wb of second region 470 changes as additive-manufacturing head 21 and workpiece 400 move relative to each other, a relation Wa<Wb is satisfied.

An area of second region 470 when projected onto a plane orthogonal to the center axis direction (the axial direction of center axis 101) of ring-shaped laser beam 311 is larger than an area of first region 460 when projected onto a plane orthogonal to the center axis direction (the axial direction of center axis 101) of ring-shaped laser beam 311. The area of second region 470 when projected onto a plane orthogonal to the center axis direction of ring-shaped laser beam 311 may be equal to the area of first region 460 when projected onto a plane orthogonal to the center axis direction of ring-shaped laser beam 311, or may be smaller than the area of first region 460 when projected onto a plane orthogonal to the center axis direction of ring-shaped laser beam 311.

The order of step of performing additive manufacturing for first region 460 of workpiece 400 and step of performing additive manufacturing for second region 470 of workpiece 400 is not particularly limited.

During step of performing additive manufacturing for first region 460 of workpiece 400, the relative movement direction of additive-manufacturing head 21 and workpiece 400 may be uniform, may continuously change, or may intermittently change. During step of performing additive manufacturing for second region 470 of workpiece 400, the relative movement direction of additive-manufacturing head 21 and workpiece 400 may be uniform, may continuously change, or may intermittently change.

During step of performing additive manufacturing for first region 460 of workpiece 400, first distance La between workpiece 400 and laser beam emitter 34 may be uniform or may change. During step of performing additive manufacturing for second region 470 of workpiece 400, second distance Lb between workpiece 400 and laser beam emitter 34 may be uniform or may change. Even when first distance La and/or second distance Lb changes, a relation Lb<La is satisfied.

During step of performing additive manufacturing for first region 460 of workpiece 400, the emission of ring-shaped laser beam 311 from additive-manufacturing head 21 and the emission of the material powder from additive-manufacturing head 21 may be performed continuously or intermittently. During step of performing additive manufacturing for second region 470 of workpiece 400, the emission of ring-shaped laser beam 311 from additive-manufacturing head 21 and the emission of the material powder from additive-manufacturing head 21 may be performed continuously or intermittently.

Additive manufacturing conditions (a type of the material powder, oscillation energy of the laser beam, a relative movement speed of additive-manufacturing head 21 and workpiece 400 (a feed speed of additive-manufacturing head 21), and the like) may be the same or different between step of performing additive manufacturing for first region 460 of workpiece 400 and step of performing additive manufacturing for second region 470 of workpiece 400.

The workpiece processing method may further include, between step of performing additive manufacturing for first region 460 of workpiece 400 and step of performing additive manufacturing for second region 470 of workpiece 400, step of causing additive-manufacturing head 21 and workpiece 400 to move relative to each other with the emission of ring-shaped laser beam 311 from additive-manufacturing head 21 and the emission of the material powder from additive-manufacturing head 21 stopped. In this case, step of causing additive-manufacturing head 21 and workpiece 400 to move relative to each other may include step of swiveling additive-manufacturing head 21 about swiveling center axis 204 (see FIGS. 1 and 2).

As illustrated in FIGS. 5 and 7, when first region 460 having relatively small width Wa on the workpiece surface is to be subjected to additive manufacturing, making the distance between workpiece 400 and laser beam emitter 34 equal to first distance La that is larger than second distance Lb causes a decrease in diameter (spot diameter) Da of ring-shaped laser beam irradiation region 312 on the workpiece surface. This makes it possible to perform precise additive manufacturing for first region 460 of workpiece 400.

As illustrated in FIGS. 6 and 8, when second region 470 having relatively large width Wb on the workpiece surface is to be subjected to additive manufacturing, making the distance between workpiece 400 and laser beam emitter 34 equal to second distance Lb that is smaller than first distance La causes an increase in diameter (spot diameter) db of ring-shaped laser beam irradiation region 312 on the workpiece surface. This makes it possible to perform efficient additive manufacturing for second region 470 of workpiece 400.

In a case where the ring-shaped laser is used in additive manufacturing for the workpiece under the directed energy deposition, even when the spot diameter on the workpiece surface increases, an intensity distribution of the laser beam does not largely decrease, and a melt pool formed on the workpiece surface can be kept high in temperature. Therefore, even when diameter db (spot diameter) of laser beam irradiation region 312 is large, the material powder fed onto the workpiece surface can be efficiently melted and stuck.

As described above, under the workpiece processing method of the present embodiment, the size of the laser beam irradiation region can be controlled in a simple manner in accordance with the region on the workpiece surface to be subjected to additive manufacturing.

With reference to FIG. 3, as a method for changing the diameter of laser beam irradiation region 312 on the workpiece surface, for example, there is a method by which the optical lens in ring-shaped laser beam forming unit 32 is driven in the optical axis direction of the laser beam. In this case, it is required that additive-manufacturing head 21 include an optical lens drive device, so that there is a possibility that the structure of additive-manufacturing head 21 becomes complicated or the optical system in additive-manufacturing head 21 becomes lower in reliability.

On the other hand, under the workpiece processing method according to the present embodiment, adjusting the distance between workpiece 400 and laser beam emitter 34 causes a change in the diameter of laser beam irradiation region 312 on the workpiece surface. Therefore, the optical lens (axicon lens 43, spherical lens 44, and axicon lens 45) in ring-shaped laser beam forming unit 32 is fixed in additive-manufacturing head 21 so as to make the distance from laser beam emitter 34 to a focal position of ring-shaped laser beam 311 uniform. This makes it possible to maintain the reliability of the optical system in additive-manufacturing head 21 while simplifying the structure of additive-manufacturing head 21.

Note that, in the present embodiment, the case where the processing machine is an AM/SM hybrid processing machine based on a combined processing machine having a turning function and a milling function has been described, but the present invention is not limited to such a configuration. For example, the processing machine may be an AM/SM hybrid processing machine based on a machining center having a milling function, or may be an AM processing machine capable of performing only additive manufacturing.

Second Embodiment

In the present embodiment, a workpiece processing method for repairing a turbine blade by additive manufacturing using processing machine 100 will be described. The workpiece processing method according to the present embodiment is basically the same in configuration as the workpiece processing method according to the first embodiment. No description will be given below of the same configuration.

Figure 9:
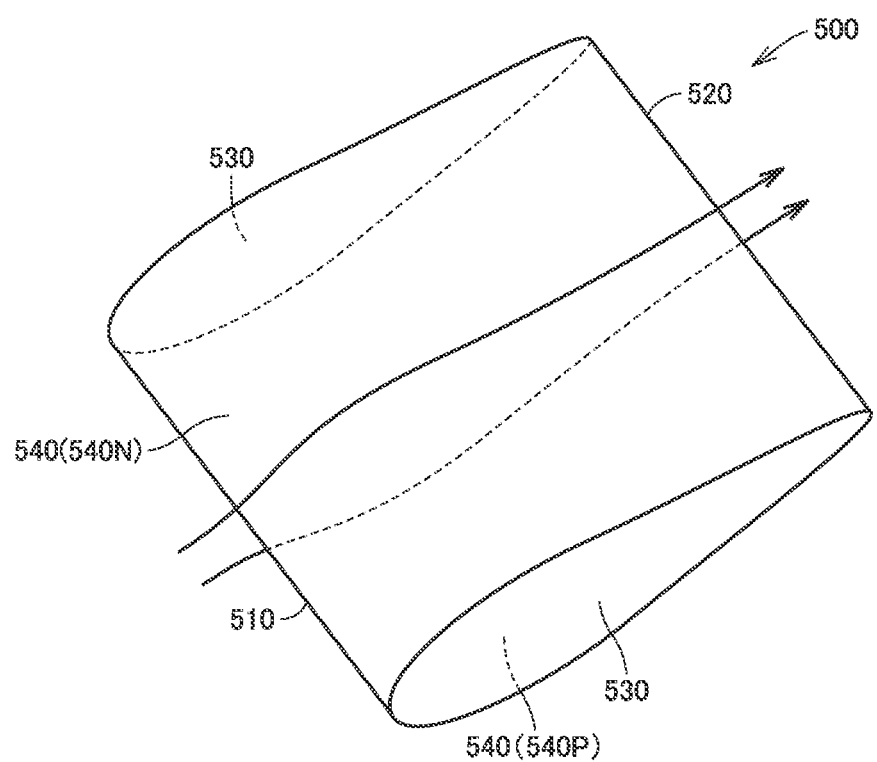
FIG. 9 is a perspective view of a turbine blade.

FIG. 9 is a perspective view of a turbine blade. First, a structure of a turbine blade 500 to be repaired under the workpiece processing method according to the present embodiment will be described with reference to FIG. 9.

Turbine blade 500 has a leading edge 510, a trailing edge 520, a blade surface 540, and a pair of turbine side surfaces 530.

Leading edge 510 is a blade front end through which a fluid such as air flows in when turbine blade 500 rotates, and has an edge shape. Trailing edge 520 is a blade rear end through which the fluid flows out when turbine blade 500 rotates, and has an edge shape.

Blade surface 540 extends between leading edge 510 and trailing edge 520. Blade surface 540 extends in a curved shape between leading edge 510 and trailing edge 520. The fluid flowing in through leading edge 510 when turbine blade 500 rotates flows along blade surface 540 toward trailing edge 520. Blade surface 540 has a positive pressure surface 540P and a negative pressure surface 540N. A relatively large pressure acts on positive pressure surface 540P by the fluid flowing on blade surface 540, and a relatively small pressure acts on negative pressure surface 540N by the fluid flowing on blade surface 540.

The pair of turbine side surfaces 530 are disposed at both ends of blade surface 540, respectively. Each of turbine side surfaces 530 is a flat surface. Each of turbine side surfaces 530 is a flat surface orthogonal to an extending direction of leading edge 510 and trailing edge 520.

Turbine blade 500 is made of a metal material such as a nickel-based alloy or Ti-6Al-4V.

As the number of uses of turbine blade 500 increases, leading edge 510 or trailing edge 520 may be partially lost, turbine side surfaces 530 may entirely wear out, or a relatively small crack or a relatively large depression may be generated in blade surface 540. Turbine blade 500 suffering such a partial loss is repaired.

Figure 10:
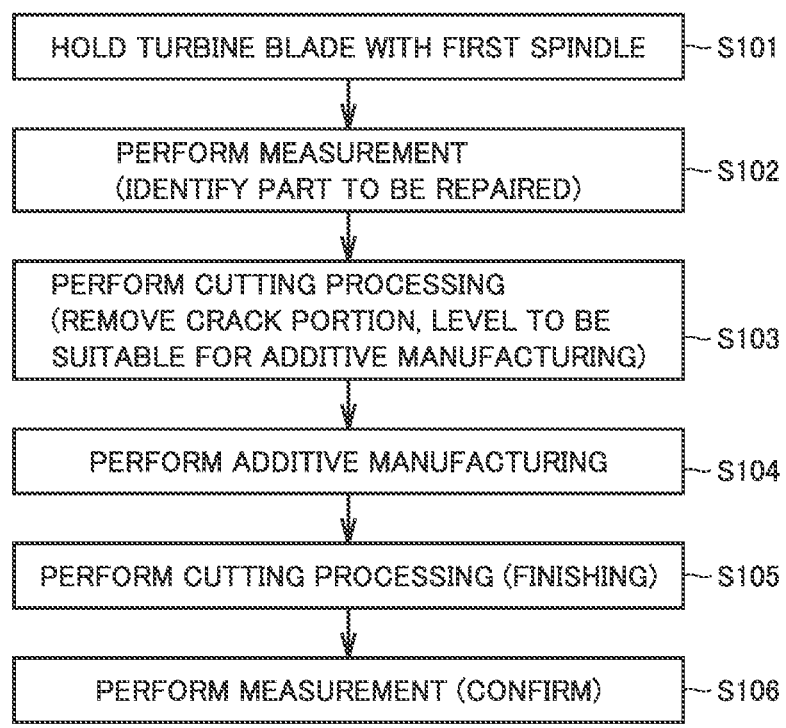
FIG. 10 is a flowchart of an overall flow of steps of repairing the turbine blade in FIG. 9.

FIG. 10 is a flowchart of an overall flow of steps of repairing the turbine blade in FIG. 9.

With reference to FIGS. 9 and 10, the overall flow of steps of repairing turbine blade 500 will be described. First, turbine blade 500 is held by first spindle 112 of first headstock 111 (S101).

In this step, turbine blade 500 is held so as to position leading edge 510, trailing edge 520, and blade surface 540 radially outward of center axis 201, center axis 201 being the rotation axis of first spindle 112, and cause turbine side surfaces 530 to face in the axial direction of center axis 101 (see FIG. 12 and the like to be described later).

Next, turbine blade 500 before repair is measured (S102). In this step, the shape of turbine blade 500 is measured using a measuring probe or the like held by tool spindle 121, so that a part of turbine blade 500 to be repaired is identified. Note that the measurement of turbine blade 500 in S102 and S106 to be described later may be performed in a non-contact manner. The measurement of turbine blade 500 in S102 and S106 to be described later may be performed using a dedicated measurement device instead of processing machine 100.

Next, turbine blade 500 is subjected to cutting processing before additive manufacturing (S103). In this step, at the part to be repaired of turbine blade 500 identified in the previous step, a crack portion is removed or a surface is leveled to be suitable for additive manufacturing.

Next, turbine blade 500 is subjected to additive manufacturing (S104). In this step, additive manufacturing is performed using the same material powder as the metal material constituting turbine blade 500, so as to overlay the part to be repaired of turbine blade 500 with the material powder.

Next, turbine blade 500 is subjected to cutting processing after the additive manufacturing (S105). In this step, the surface of turbine blade 500 is finished by performing cutting processing on the overlay applied to turbine blade 500 in the previous step.

Next, turbine blade 500 is measured (S106). In this step, the shape of repaired turbine blade 500 is finally confirmed.

Note that, in step of repairing turbine blade 500 described above, step of performing cutting processing on turbine blade 500 in S103 and S105, and step of measuring turbine blade 500 in S102 and S106 need not necessarily be performed.

The workpiece processing method according to the present embodiment corresponds to a method obtained by applying the workpiece processing method according to the present invention to the additive manufacturing for turbine blade 500 in S104 described above. Hereinafter, the workpiece processing method according to the present embodiment will be described in detail.

Figure 11:
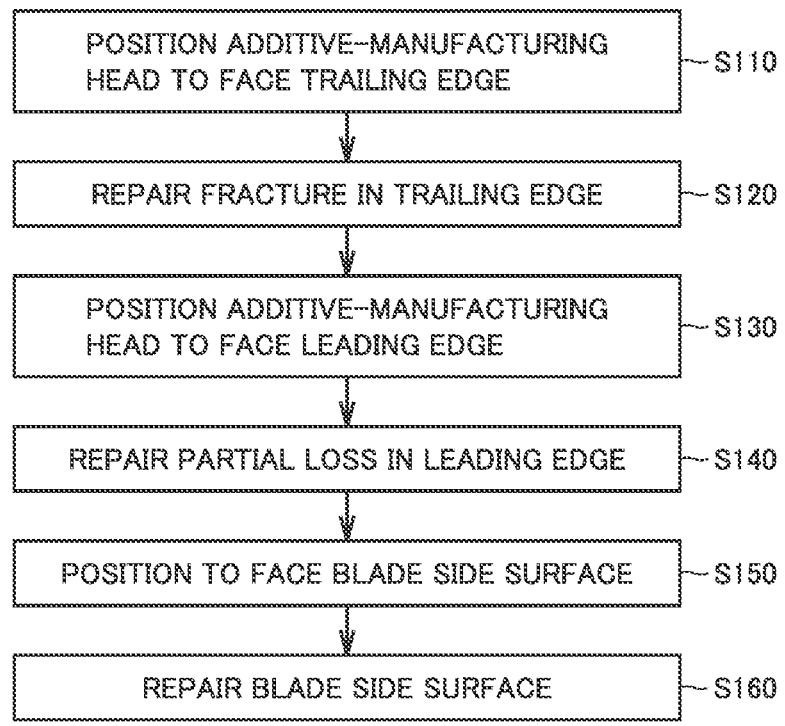
FIG. 11 is a flowchart of steps of a workpiece processing method according to a second embodiment of the present invention.
Figure 13:
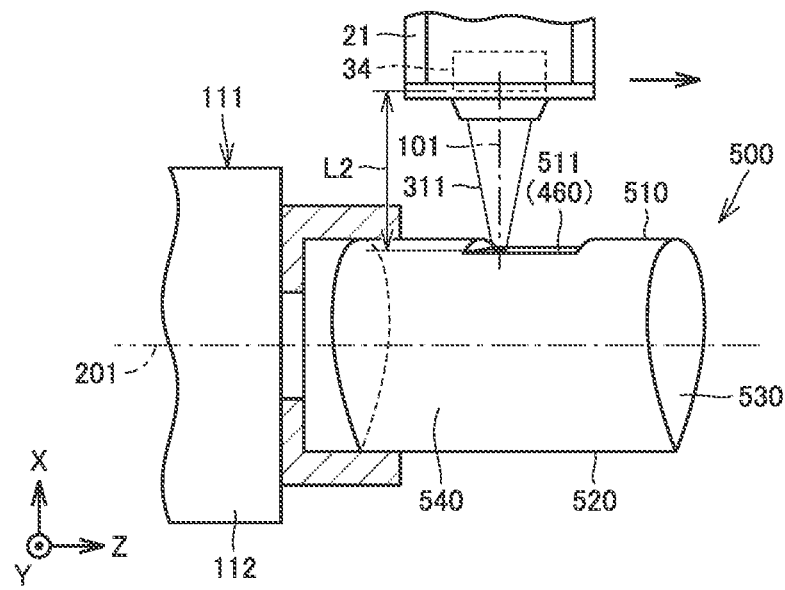
FIG. 13 is a front view illustrating a second step of the workpiece processing method according to the second embodiment of the present invention.
Figure 14:
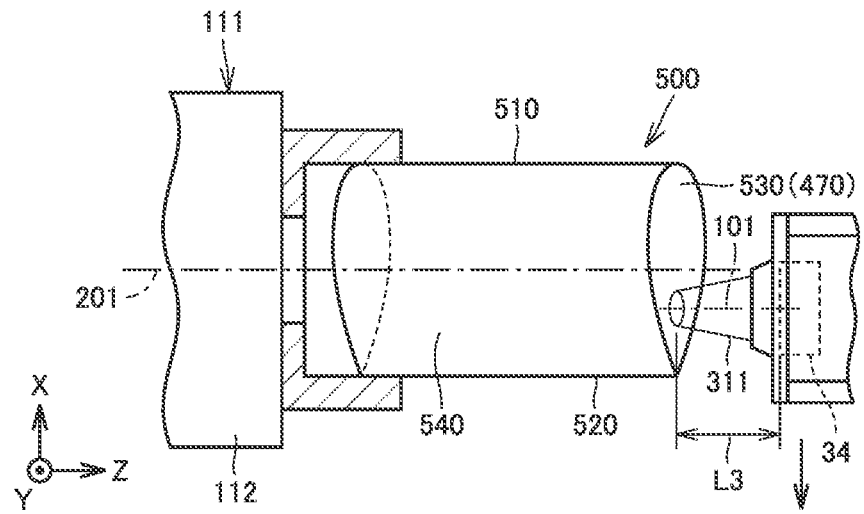
FIG. 14 is a front view illustrating a third step of the workpiece processing method according to the second embodiment of the present invention.

FIG. 11 is a flowchart of steps of the workpiece processing method according to the second embodiment of the present invention. FIGS. 12 to 14 are front views illustrating steps of the workpiece processing method according to the second embodiment of the present invention. FIGS. 12 to 14 schematically illustrate turbine blade 500 held by first spindle 112 of first headstock 111 and partial losses 511, 521 generated in turbine blade 500. When the cutting processing in S103 in FIG. 10 before the additive manufacturing is performed, partial losses 511, 521 correspond to processing marks obtained by performing cutting processing on the partial loss portions.

Figure 12:
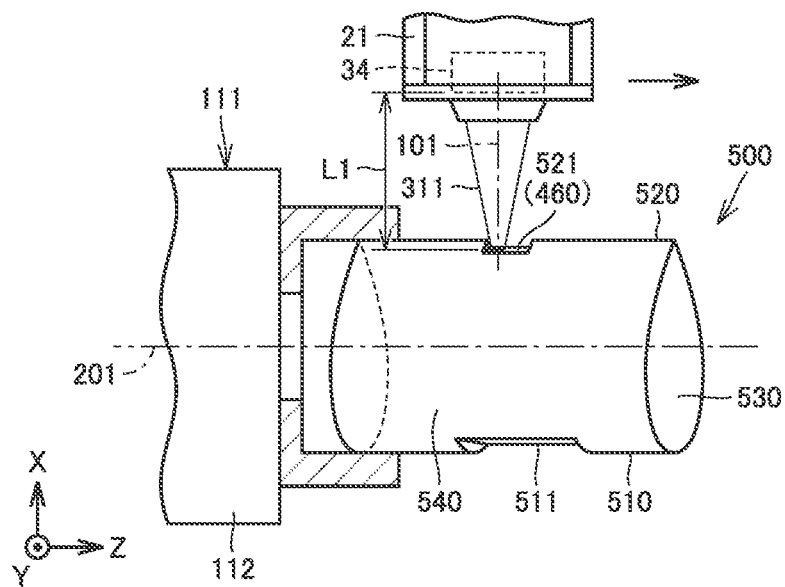
FIG. 12 is a front view illustrating a first step of the workpiece processing method according to the second embodiment of the present invention.

With reference to FIGS. 11 and 12, first, additive-manufacturing head 21 is positioned to face trailing edge 520 (S110).

In this step, first spindle 112 is rotated so as to position trailing edge 520 over center axis 201. Additive-manufacturing head 21 attached to tool spindle 121 is positioned over and away from partial loss 521 generated in trailing edge 520 with tool spindle 121 set at the reference posture. At this time, a distance between laser beam emitter 34 and partial loss 521 in the X-axis direction is denoted as L1.

Next, partial loss 521 (first region 460) generated in trailing edge 520 is repaired (S120). This step corresponds to a "step of performing additive manufacturing for the first region of the workpiece" according to the present invention.

In this step, additive-manufacturing head 21 is moved along the X-axis direction with distance L1 between laser beam emitter 34 and partial loss 521 maintained. While ring-shaped laser beam 311 is being emitted from additive-manufacturing head 21 toward partial loss 521, the material powder is ejected from the inside of ring-shaped laser beam 311.

The above-described additive manufacturing overlays partial loss 521 generated in trailing edge 520 with a metal layer where the material powder is melted and stuck. Upon completion of the necessary additive manufacturing for trailing edge 520, the emission of ring-shaped laser beam 311 and the ejection of the material powder from additive-manufacturing head 21 are stopped.

With reference to FIGS. 11 and 13, next, additive-manufacturing head 21 is positioned to face leading edge 510 (S130).

In this step, first spindle 112 is rotated by 180°. Additive-manufacturing head 21 attached to tool spindle 121 is positioned over and away from partial loss 511 generated in leading edge 510 with tool spindle 121 maintained at the reference posture. At this time, a distance between laser beam emitter 34 and partial loss 511 in the X-axis direction is denoted as L2. A magnitude relation between distance L1 and distance L2 is not particularly limited. Distance L1 and distance L2 may be equal to each other.

Next, partial loss 511 (first region 460) generated in leading edge 510 is repaired (S140). This step corresponds to the "step of performing additive manufacturing for the first region of the workpiece" according to the present invention.

In this step, additive-manufacturing head 21 is moved along the X-axis direction with distance L2 between laser beam emitter 34 and partial loss 511 maintained. While ring-shaped laser beam 311 is being emitted from additive-manufacturing head 21 toward partial loss 511, the material powder is ejected from the inside of ring-shaped laser beam 311.

The above-described additive manufacturing overlays partial loss 511 generated in leading edge 510 with a metal layer where the material powder is melted and stuck. Upon completion of the necessary additive manufacturing for leading edge 510, the emission of ring-shaped laser beam 311 and the ejection of the material powder from additive-manufacturing head 21 are stopped.

With reference to FIGS. 11 and 14, next, additive-manufacturing head 21 is positioned to face turbine side surface 530 (S150).

In this step, tool spindle 121 is swiveled clockwise by 90° from the reference posture. Swiveling additive-manufacturing head 21 about swiveling center axis 204 together with tool spindle 121 causes a change in the posture of additive-manufacturing head 21. Additive-manufacturing head 21 attached to tool spindle 121 is positioned away from turbine side surface 530 in the +Z-axis direction. At this time, a distance between laser beam emitter 34 and turbine side surface 530 in the Z-axis direction is denoted as L3. Distance L3 is smaller than distance L1 and smaller than distance L2 (L3<L1, L2).

Next, turbine side surface 530 (second region 470) that has entirely worn out is repaired (S160). This step corresponds to a "step of performing additive manufacturing for the second region of the workpiece" according to the present invention.

In this step, additive-manufacturing head 21 is moved back and forth along the X-axis direction (or the Y-axis direction) with distance L3 between laser beam emitter 34 and turbine side surface 530 maintained. While ring-shaped laser beam 311 is being emitted from additive-manufacturing head 21 toward turbine side surface 530, the material powder is ejected from the inside of ring-shaped laser beam 311.

The above-described additive manufacturing forms a metal layer where the material powder is melted and stuck on turbine side surface 530 that has entirely worn out. Upon completion of the necessary additive manufacturing for turbine side surface 530, the emission of ring-shaped laser beam 311 and the ejection of the material powder from additive-manufacturing head 21 are stopped.

Such a configuration allows partial losses 511, 521 generated in leading edge 510 and trailing edge 520 to be subjected to precise additive manufacturing and allows turbine side surface 530 that has entirely worn out to be subjected to efficient additive manufacturing.

Further, rotating first spindle 112 that holds turbine blade 500 or swiveling additive-manufacturing head 21 about swiveling center axis 204 allows leading edge 510, trailing edge 520, and turbine side surface 530 to be successively processed with turbine blade 500 held by first spindle 112.

Figure 15:
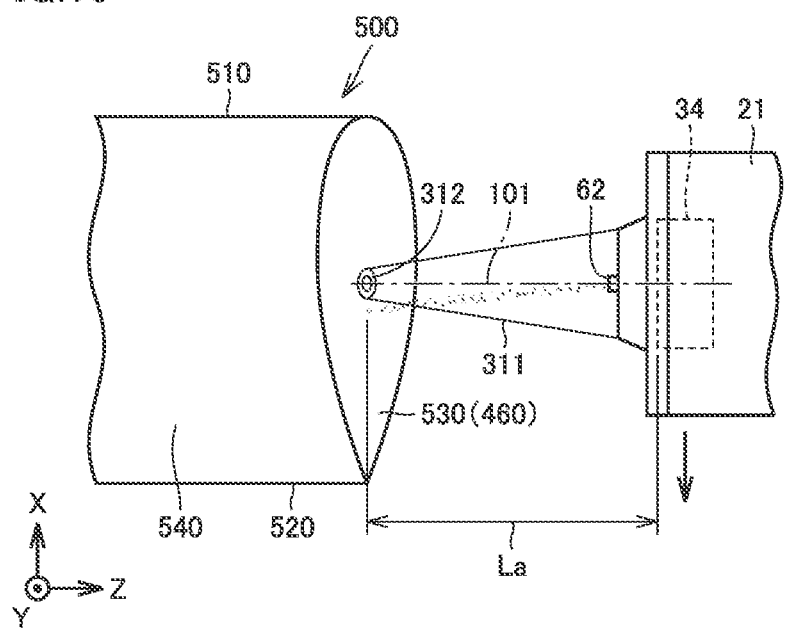
FIG. 15 is a front view illustrating step of repairing a turbine side surface as a first region.
Figure 16:
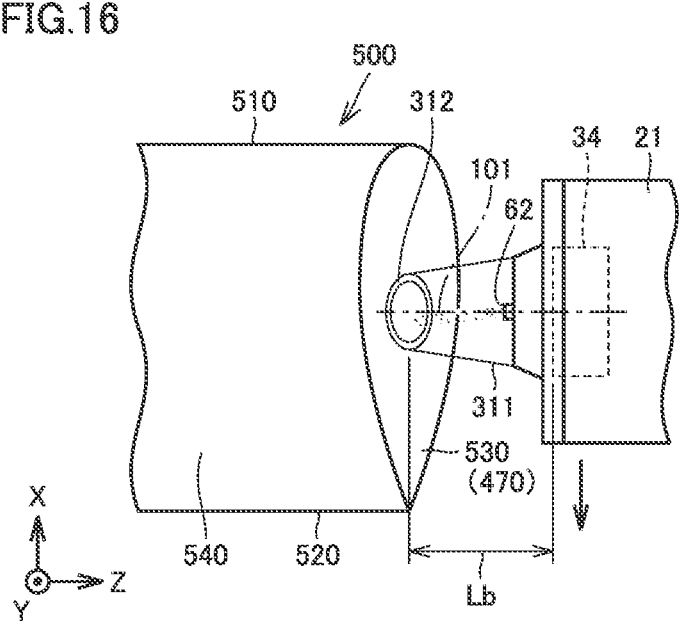
FIG. 16 is a front view illustrating step of repairing the turbine side surface as a second region.

FIG. 15 is a front view illustrating step of repairing the turbine side surface as the first region. FIG. 16 is a front view illustrating step of repairing the turbine side surface as the second region.

With reference to FIGS. 15 and 16, in step of repairing turbine side surface 530, center axis 101 of ring-shaped laser beam 311 emitted from additive-manufacturing head 21 extends in the horizontal direction, and the material powder emitted from additive-manufacturing head 21 is directed toward turbine side surface 530 along center axis 101 extending in the horizontal direction.

As illustrated in FIG. 15, when turbine side surface 530 as first region 460 is subjected to additive manufacturing, distance La between laser beam emitter 34 and turbine side surface 530 is set at a relatively large value (La>Lb). Therefore, there is a possibility that the material powder ejected from additive-manufacturing head 21 falls downward due to gravity as a distance from additive-manufacturing head 21 increases and is fed to a region deviated from laser beam irradiation region 312 formed on turbine side surface 530.

As illustrated in FIG. 16, when turbine side surface 530 as second region 470 is subjected to additive manufacturing, distance Lb between laser beam emitter 34 and turbine side surface 530 is set at a relatively small value (Lb<La). This makes it possible to reduce the degree where the material powder ejected from additive-manufacturing head 21 falls downward and feed a larger amount of the material powder to the inside of laser beam irradiation region 312 (outer peripheral edge 312p in FIG. 8). This in turn allows an increase in utilization efficiency of the material powder.

The workpiece processing method according to the second embodiment of the present invention configured as described above can produce the same effects as described in the first embodiment.

Third Embodiment

A workpiece processing method according to the present embodiment is basically the same in configuration as the workpiece processing method according to the second embodiment. No description will be given below of the same configuration.

Figure 17:
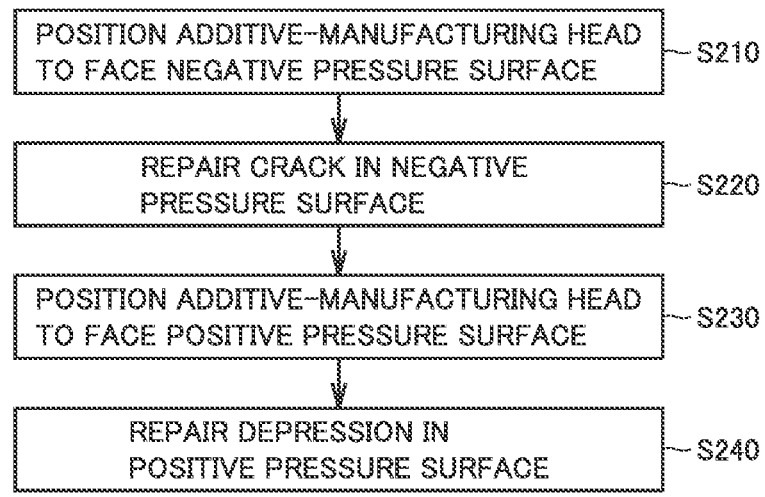
FIG. 17 is a flowchart of steps of a workpiece processing method according to a third embodiment of the present invention.
Figure 18:
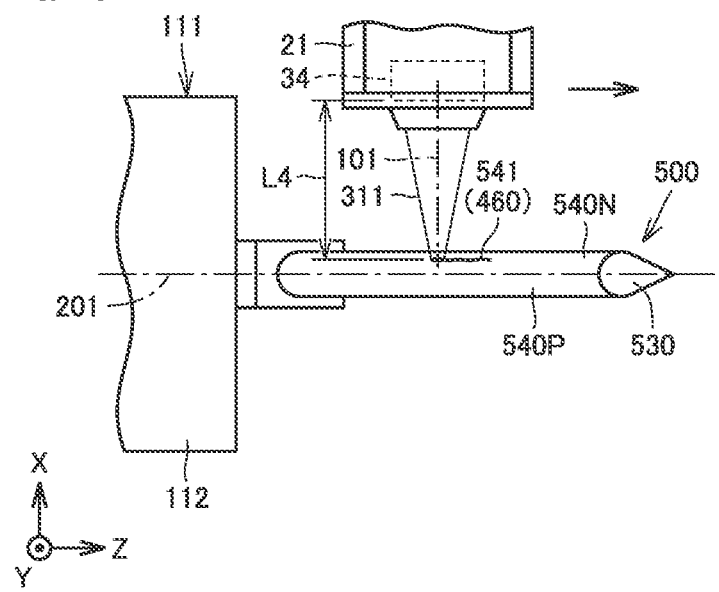
FIG. 18 is a front view illustrating a first step of the workpiece processing method according to the third embodiment of the present invention.
Figure 19:
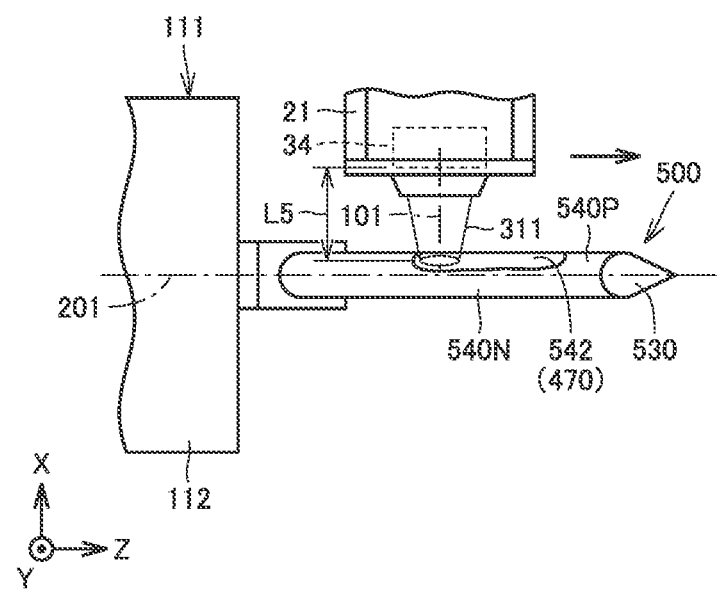
FIG. 19 is a front view illustrating a second step of the workpiece processing method according to the third embodiment of the present invention.

FIG. 17 is a flowchart of steps of the workpiece processing method according to the third embodiment of the present invention. FIGS. 18 and 19 are front views illustrating steps of the workpiece processing method according to the third embodiment of the present invention. FIGS. 18 and 19 schematically illustrate turbine blade 500 held by first spindle 112 of first headstock 111 and a crack 541, and a depression 542 generated in turbine blade 500. When the cutting processing in S103 in FIG. 10 before the additive manufacturing is performed, crack 541 and depression 542 correspond to processing marks obtained by performing cutting processing on the crack portion and the depression portion.

With reference to FIGS. 17 and 18, first, additive-manufacturing head 21 is positioned to face negative pressure surface 540N of blade surface 540 (S210).

In this step, first spindle 112 is rotated so as to position negative pressure surface 540N of blade surface 540 over center axis 201. Additive-manufacturing head 21 attached to tool spindle 121 is positioned over and away from crack 541 generated in negative pressure surface 540N with tool spindle 121 set at the reference posture. At this time, a distance between laser beam emitter 34 and crack 541 in the X-axis direction is denoted as L4.

Next, crack 541 (first region 460) generated in negative pressure surface 540N is repaired (S220). This step corresponds to the "step of performing additive manufacturing for the first region of the workpiece" according to the present invention.

In this step, additive-manufacturing head 21 is moved along the X-axis direction with distance L4 between laser beam emitter 34 and crack 541 maintained. While ring-shaped laser beam 311 is being emitted from additive-manufacturing head 21 toward crack 541, the material powder is ejected from the inside of ring-shaped laser beam 311.

The additive manufacturing overlays crack 541 generated in negative pressure surface 540N with a metal layer where the material powder is melted and stuck. Upon completion of the necessary additive manufacturing for negative pressure surface 540N, the emission of ring-shaped laser beam 311 and the ejection of the material powder from additive-manufacturing head 21 are stopped.

With reference to FIGS. 17 and 19, next, additive-manufacturing head 21 is positioned to face positive pressure surface 540P of blade surface 540 (S230).

In this step, first spindle 112 is rotated by 180°. Additive-manufacturing head 21 attached to tool spindle 121 is positioned over and away from depression 542 generated in positive pressure surface 540P with tool spindle 121 maintained at the reference posture. At this time, a distance between laser beam emitter 34 and depression 542 in the X-axis direction is denoted as L5. Distance L5 is smaller than distance L4 (L5<L4).

Next, depression 542 (second region 470) generated in positive pressure surface 540P is repaired (S240). This step corresponds to the "step of performing additive manufacturing for the second region of the workpiece" according to the present invention.

In this step, additive-manufacturing head 21 is moved along the X-axis direction with distance L5 between laser beam emitter 34 and depression 542 maintained. While ring-shaped laser beam 311 is being emitted from additive-manufacturing head 21 toward depression 542, the material powder is ejected from the inside of ring-shaped laser beam 311.

The above-described additive manufacturing overlays depression 542 generated in positive pressure surface 540P with a metal layer where the material powder is melted and stuck. Upon completion of the necessary additive manufacturing for positive pressure surface 540P, the emission of ring-shaped laser beam 311 and the ejection of the material powder from additive-manufacturing head 21 are stopped.

Such a configuration allows crack 541 generated in negative pressure surface 540N to be subjected to precise additive manufacturing and allows depression 542 generated in positive pressure surface 540P to be subjected to efficient additive manufacturing. Further, rotating first spindle 112 that holds turbine blade 500 allows negative pressure surface 540N and positive pressure surface 540P of blade surface 540 to be successively processed with turbine blade 500 held by first spindle 112.

Note that the workpiece processing method according to the present invention may be applied to a case where a crack and a depression generated in the same plane of blade surface 540, or may be applied to a case where large and small depressions generated in blade surface 540. The step of repairing the turbine blade described in the second embodiment and step of repairing the turbine blade described in the present embodiment may be combined as needed.

The workpiece processing method according to the third embodiment of the present invention configured as described above can produce the same effects as described in the first embodiment.

It should be understood that the embodiments disclosed herein are illustrative in all respects and not restrictive. The scope of the present invention is defined by the claims rather than the above description, and the present invention is intended to include the claims, equivalents of the claims, and all modifications within the scope of claims.

INDUSTRIAL APPLICABILITY

The present invention is mainly applied to additive manufacturing for a workpiece.

REFERENCE SIGNS LIST

21: additive-manufacturing head, 24: cable, 26: cover body, 27: opening, 31: laser beam collimator, 32: ring-shaped laser beam forming unit, 33: laser beam guide, 34: laser beam emitter, 41: optical fiber, 42: collimation lens, 43, 45: axicon lens, 43m, 45m: one surface, 43n, 45n: other surface, 44: spherical lens, 46, 47: guide mirror, 48, 52, 55, 57: through-hole, 51, 54: condenser lens, 56: protective lens, 61: material powder feeding unit, 62: ejection port, 70: powder feeder, 71: mixer, 72: powder hopper, 76: laser oscillation device, 100: processing machine, 101, 102, 201, 202, 203, 206: center axis, 111: first headstock, 112: first spindle, 116: second headstock, 117: second spindle, 121: tool spindle, 123: spindle end surface, 131: tool rest, 132: swiveling portion, 136: bed, 200: processing area, 204: swiveling center axis, 205: splash guard, 311: ring-shaped laser beam, 312: laser beam irradiation region, 312p: outer peripheral edge, 400: workpiece, 410: curve, 460: first region, 470: second region, 500: turbine blade, 510: leading edge, 511, 521: partial loss, 520: trailing edge, 530: turbine side surface, 540: blade surface, 540N: negative pressure surface, 540P: positive pressure surface, 541: crack

The invention claimed is:

1. A workpiece processing method for performing additive manufacturing for a workpiece by emitting a ring-shaped laser beam from an additive-manufacturing head toward the workpiece, and ejecting material powder from an inside of the ring-shaped laser beam while causing the additive-manufacturing head and the workpiece to move relative to each other, the additive-manufacturing head including a laser beam emitter that emits the ring-shaped laser beam toward the workpiece, the workpiece processing method comprising:

performing additive manufacturing for a first region of the workpiece; and performing additive manufacturing for a second region of the workpiece, wherein a width of the first region in a direction that is orthogonal to a direction in which the additive-manufacturing head and the workpiece move relative to each other and a center axis direction of the ring-shaped laser beam is smaller than a width of the second region in a direction that is orthogonal to the direction in which the additive-manufacturing head and the workpiece move relative to each other and the center axis direction of the ring-shaped laser beam, the performing additive manufacturing for the first region includes positioning the additive-manufacturing head and the workpiece relative to each other so as to make a distance between the workpiece and the laser beam emitter equal to a first distance, and the performing additive manufacturing for the second region includes positioning the additive-manufacturing head and the workpiece relative to each other so as to make the distance between the workpiece and the laser beam emitter equal to a second distance that is smaller than the first distance.

2. The workpiece processing method according to claim 1, wherein the additive-manufacturing head is swivelable about a predetermined axis orthogonal to the center axis direction of the ring-shaped laser beam, the workpiece processing method further comprising, between the performing additive manufacturing for the first region and performing additive manufacturing for the second region, changing a posture of the additive-manufacturing head by swiveling the additive-manufacturing head about the predetermined axis.

3. The workpiece processing method according to claim 2, wherein in the performing additive manufacturing for the second region, the posture of the additive-manufacturing head is maintained so as to make the center axis of the ring-shaped laser beam parallel to a horizontal direction.

4. The workpiece processing method according to claim 1, wherein the workpiece is a turbine blade having a leading edge, a trailing edge, a blade surface extending between the leading edge and the trailing edge, and a side surface that is a flat surface disposed at an end of the blade surface, the turbine blade being repaired by additive manufacturing, the leading edge or the trailing edge includes the first region, and the side surface includes the second region.

5. The workpiece processing method according to claim 1, wherein the workpiece is a turbine blade having a leading edge, a trailing edge, a blade surface extending between the leading edge and the trailing edge, and a side surface that is a flat surface disposed at an end of the blade surface, the turbine blade being repaired by additive manufacturing, the blade surface includes the first region and the second region.

6. The workpiece processing method according to claim 4, wherein the additive-manufacturing head is swivelable about a predetermined axis extending in a horizontal direction, the workpiece processing method further comprising, before the performing additive manufacturing for the first region and the performing additive manufacturing for the second region, holding the workpiece with a spindle extending in the horizontal direction and having a rotation axis orthogonal to the predetermined axis so as to position the leading edge, the trailing edge, and the blade surface radially outward of the rotation axis and causing the side surface to face in an axial direction of the rotation axis.

7. A processing machine that performs the workpiece processing method according to claim 1, the processing machine comprising:
- the additive-manufacturing head including the laser beam emitter;
- a workpiece holder that holds the workpiece; and
- a moving mechanism that causes the additive-manufacturing head and the workpiece holder to move relative to each other.

8. The processing machine according to claim 7, wherein
the additive-manufacturing head includes an optical lens, and
the optical lens is fixed in the additive-manufacturing head so as to make a distance from the laser beam emitter to a focal position of the ring-shaped laser beam uniform.

* * * * *